United States Patent
Mueller et al.

(10) Patent No.: US 9,650,542 B2
(45) Date of Patent: May 16, 2017

(54) USE OF POLYPROPYLENEIMINE AS CURING AGENT FOR EPOXIDE RESINS

(71) Applicant: BASF SE, Ludwigshafen (DE)

(72) Inventors: Christoph Mueller, Mannheim (DE); Christian Mueller, Mannheim (DE); Kirsten Dahmen, Bad Duerkheim (DE); Alexander Panchenko, Ludwigshafen (DE); Ansgar Gereon Altenhoff, Heidelberg (DE); Monika Charrak, Ludwigshafen (DE); Andreas Kunst, Ludwigshafen (DE); Michael Henningsen, Frankenthal (DE); Achim Kaffee, Osnabrueck (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/771,681

(22) PCT Filed: Jul. 29, 2014

(86) PCT No.: PCT/EP2014/066296
§ 371 (c)(1),
(2) Date: Aug. 31, 2015

(87) PCT Pub. No.: WO2015/022186
PCT Pub. Date: Feb. 19, 2015

(65) Prior Publication Data
US 2016/0024344 A1 Jan. 28, 2016

(30) Foreign Application Priority Data

Aug. 13, 2013 (EP) .................................... 13180286

(51) Int. Cl.
| | | |
|---|---|---|
| C08L 63/00 | (2006.01) | |
| C08G 65/48 | (2006.01) | |
| C08F 283/00 | (2006.01) | |
| C09D 179/02 | (2006.01) | |
| C09D 163/00 | (2006.01) | |
| C08G 59/40 | (2006.01) | |
| C08L 79/02 | (2006.01) | |
| C08K 7/02 | (2006.01) | |
| C08G 73/02 | (2006.01) | |

(52) U.S. Cl.
CPC ....... *C09D 179/02* (2013.01); *C08G 59/4042* (2013.01); *C08L 79/02* (2013.01); *C09D 163/00* (2013.01); *C08G 73/0206* (2013.01); *C08G 73/0213* (2013.01); *C08K 7/02* (2013.01)

(58) Field of Classification Search
CPC ...... C09D 179/02; C09D 163/00; C08K 7/02; C08G 59/4042; C08G 73/0206; C08G 73/0213; C08L 79/02
USPC .......................... 524/540; 525/523, 534, 540
See application file for complete search history.

(56) References Cited

U.S. PATENT DOCUMENTS

| | | | | |
|---|---|---|---|---|
| 3,905,923 | A * | 9/1975 | Klug | C12N 11/04 428/423.1 |
| 4,205,128 | A * | 5/1980 | Ishimatsu | B29C 47/0004 435/182 |
| 8,987,518 | B2 | 3/2015 | Altenhoff et al. | |
| 2010/0078381 | A1 * | 4/2010 | Merchant | B01D 67/0006 210/632 |
| 2013/0037213 | A1 | 2/2013 | Frick et al. | |

FOREIGN PATENT DOCUMENTS

| | | | | |
|---|---|---|---|---|
| EP | 0186523 | A2 * | 7/1986 | ............. C12N 11/04 |
| EP | 0 636 409 | A1 | 2/1995 | |
| EP | 2 365 011 | A1 | 9/2011 | |
| WO | WO 99/58608 | A1 | 11/1999 | |

OTHER PUBLICATIONS

Search Report issued Jun. 6, 2014 in German Patent Application No. 10 2013 216 031.3 (with English Translation of Categories of Cited Documents).
Jintao Wan, et al., "Learning about novel amine-adduct curing agents for epoxy resins: Butyl-glycidylether-modified poly(propyleneimine) dendrimers" Thermochimica Acta, 2011, pp. 72-82.

* cited by examiner

*Primary Examiner* — David Karst
(74) *Attorney, Agent, or Firm* — Oblon, McClelland, Maier & Neustadt, L.L.P.

(57) ABSTRACT

The present invention relates to the use of substantially linear polypropyleneimine as a hardener for epoxy resins, and also to a corresponding curable composition, to the curing thereof, and to the cured epoxy resin obtainable therefrom.

19 Claims, No Drawings

USE OF POLYPROPYLENEIMINE AS CURING AGENT FOR EPOXIDE RESINS

CROSS REFERENCE TO RELATED APPLICATION

This application is a 371 of PCT/EP2014/066296, filed on Jul. 29, 2014, and claims priority to European Patent Application No. 13180286.0, filed on Aug. 13, 2013.

The present invention relates to the use of substantially linear polypropyleneimine (PPI) as a hardener for epoxy resins, and also to a curable composition which comprises one or more epoxy resins and substantially linear PPI. The invention further relates to the curing of the curable composition and also to the cured epoxy resin obtained by curing the curable composition.

Epoxy resins are general knowledge and by virtue of their toughness, flexibility, adhesion, and chemical resistance are used as materials for surface coating, as adhesives, and for molding and laminating. Epoxy resins are used especially for producing carbon fiber-reinforced or glass fiber-reinforced composite materials.

Epoxide materials are polyethers and may be prepared, for example, by condensing epichlorohydrin with a diol, such as an aromatic diol like bisphenol A, for example. These epoxy resins are subsequently cured by reaction with a hardener, typically a polyamine.

Starting from epoxide compounds having at least two epoxide groups, curing may be accomplished, with an amino compound having two amino groups, for example, by means of a polyaddition reaction (chain extension). Amino compounds of high reactivity are generally not added until shortly before the desired cure. Such systems are therefore what are called two-component (2K) systems.

Aminic hardeners are divided fundamentally, according to their chemical structure, into aliphatic, cycloaliphatic, or aromatic types. A further possibility for classification is on the basis of the degree of substitution of the amino group, which may be either primary, secondary, or else tertiary. For the tertiary amines, however, a catalytic curing mechanism of epoxy resins is postulated, whereas for the secondary and primary amines, stoichiometric curing reactions are taken in each case as the basis for the construction of the polymer network.

In general it has been demonstrated that among the primary amine hardeners, the aliphatic amines exhibit the greatest reactivity in epoxide curing. The cycloaliphatic amines typically react somewhat more slowly, while the aromatic amines (amines in which the amino groups are bonded directly to a C atom in the aromatic ring) display by far the least reactivity.

These known reactivity differences are exploited when curing epoxy resins in order to be able to tailor the processing life and the mechanical properties of the cured epoxy resins to the specific requirements.

For fast-curing systems with cure times of, for example, ≤10 minutes, such as adhesives, floor coatings, and certain resin transfer molding (RTM) applications, for example, short-chain aliphatic amines are frequently used, whereas, when producing extensive composite materials, a longer pot life is needed in order to allow the mold to be uniformly filled and the reinforcing fibers to be adequately impregnated. Employed in this case, primarily, are cycloaliphatic amines such as, for example, isophoronediamine (IPDA), 4,4'-diaminodicyclohexylmethane (dicycan), 3,3'-dimethyl-4,4'-diaminodicyclohexylmethane (dimethyldicycan), hydrogenated bisaniline A (2,2-di(4-aminocyclohexyl)propane), hydrogenated toluenediamines (such as, for example, 2,4-diamino-1-methylcyclohexane or 2,6-diamino-1-methylcyclohexane), and 1,3-bis(aminomethyl)cyclohexane (1,3-BAC). Even longer cure times could be achieved through the use of aromatic polyamines such as, for example, phenylenediamines (ortho, meta, or para), bisaniline A, toluenediamines (e.g., 2,4-toluenediamine or 2,6-toluenediamine), diaminodiphenylmethane (DDM), diaminodiphenyl sulfone (DDS), 2,4-diamino-3,5-diethyltoluene, or 2,6-diamino-3,5-diethyltoluene (DETDA 80).

Especially for application in the context of floor coatings, hardeners are needed which cure rapidly with epoxy resin even at room temperature, without exhibiting excessive initial viscosity, and which produce coatings having favorable mechanical properties. The coatings preferably attain early water resistance within just a few hours.

Typically, for these applications, hardeners such as triethylenetetramine (TETA) or Polyetheramine D-230 (difunctional, primary polyetheramine based on polypropylene glycol, with an average molar mass of 230 (D230)) are used. A particular disadvantage of these hardeners is their comparatively high volatility, which may have adverse consequences in the course of processing and also later in the event of incomplete reaction with the epoxy resin.

Wan et al. (Thermochimica Acta (2011), vol. 519, pp. 72-82) describes inter alia the use of a dendritic polypropyleneimine, namely EDA-dendr-$(NH_2)_4$ with the formula $(H_2N—CH_2—CH_2—CH_2—)_2N—CH_2—CH_2—N(—CH_2—CH_2—CH_2—NH_2)_2$, in the hardening of epoxy resins.

It would be desirable to have aminic hardeners for epoxy resins having properties just as favorable as those of TETA or D230, but with a lower volatility.

The problem on which the invention is based may therefore be considered that of providing a rapid-curing aminic hardener for epoxy resins which allows a comparatively low initial viscosity for the curable epoxy resin composition and which permits good structural properties (such as, for example, the glass transition temperature (Tg), flexibility, fracture resistance, and Shore D hardness) for the cured epoxy resin, and at the same time has a comparatively low volatility. Such a hardener ought also to produce early water resistance of the curing epoxy resin within a comparatively short time span.

The present invention relates accordingly to the use of substantially linear polypropyleneimine (PPI) as a hardener for epoxy resins, and also to a curable composition which comprises a resin component and a hardener component, the resin component comprising one or more epoxy resins and the hardener component comprising PPI which is substantially linear.

For the purposes of the present invention, PPI may also be considered to be polypropylene polyamine. PPI of the invention has on average at least 5 N atoms in the form of primary, secondary, or tertiary amino groups per molecule.

For the purposes of the present invention, the term "polypropyleneimine (PPI)" relates not only to polypropyleneimine homopolymers but also to polyalkyleneimines which as well as $N—CH_2—CH_2—CH_2—N$ or $N—CH_2—CH(CH_3)—N$ structural elements also have other alkylenediamine structural elements such as, for example, $N—CH_2—CH_2—N$, $N—(CH_2)_4—N$, $N—(CH_2)_6—N$, or $N—(CH_2)_8—N$ structural elements, with the $N—CH_2—CH_2—CH_2—N$ and $N—CH_2—CH(CH_3)—N$ structural elements making up the majority of the molar fraction, preferably at least 60 mol %, more particularly at least 70 mol %, based on all the alkylenediamine structural elements. In one particular embodiment the PPI of the invention has only N—CH$_2$—CH$_2$—CH$_2$—N or N—CH$_2$—CH(CH$_3$)—N structural elements, more particularly only N—CH$_2$—CH$_2$—CH$_2$—N structural elements.

In principle PPI may be linear or branched, with the branching forming a tertiary amino group. Branches may be alkyleneamino groups as such (e.g., —(CH$_2$)$_3$—NH$_2$ groups), or else longer branches composed of a plurality of alkylenediamine structural elements, which themselves in turn may be branched (e.g., —(CH$_2$)$_3$—N(CH$_2$CH$_2$CH$_2$NH$_2$)$_2$ groups). The degree of branching (DB) may be determined, for example, by means of $^{13}$C-NMR or $^{15}$N-NMR spectroscopy. In accordance with the Fréchet approximation, the degree of branching is determined as follows:

$$DB_F=(D+T)/(D+T+L),$$

where D ("dendritic") corresponds to the fraction of tertiary amino groups, L ("linear") corresponds to the fraction of secondary amino groups, and T ("terminal") corresponds to the fraction of primary amino groups. This approximation, however, does not include the focal group of the branched polymer, and is also valid only for high degrees of polymerization. An appropriate description of the ratios in the oligomer range as well is possible using the Frey definition of DB. According to this definition:

$$DB_{HF}=2D/(2D+L)$$

In the context of the present invention, CH$_3$ groups are not considered to represent branching.

The PPI of the invention has few or no branches, and is therefore substantially linear or linear. Substantially linear PPI is preferably a PPI having a DB$_{HF}$ of ≤0.3, more particularly of ≤0.1, very preferably of ≤0.05.

PPI of the invention is prepared preferably by catalytic polytransamination of propanediamine, optionally together with at least one further diamine.

Examples of propanediamine are propane-1,2-diamine and propane-1,3-diamine, and mixtures thereof. Particularly preferred is the polytransamination of propane-1,3-diamine.

Optionally it is possible for up to 40 mol %, more particularly up to 30 mol %, of the propanediamine to be replaced by one or more aliphatic diamines (further diamines). Such further diamines are preferably linear, branched, or cyclic aliphatic diamines. Examples of such further diamines are ethylenediamine, butylenediamine (e.g., 1,4-butylenediamine or 1,2-butylenediamine), diaminopentane (e.g., 1,5-diaminopentane or 1,2-diaminopentane), diaminohexane (e.g., 1,6-diaminohexane, 1,2-diaminohexane, or 1,5-diamino-2-methyl-pentane), diaminoheptane (e.g., 1,7-diaminoheptane or 1,2-diaminoheptane), diaminooctane (e.g., 1,8-diaminooctane or 1,2-diaminooctane), diaminononane (e.g., 1,9-diaminononane or 1,2-diaminononane), diaminodecane (e.g., 1,10-diaminodecane or 1,2-diaminodecane), diaminoundecane (e.g., 1,11-diaminoundecane or 1,2-diaminoundecane), diaminododecane (e.g., 1,12-diaminododecane or 1,2-diaminododecane), the corresponding α,ω-diamines being preferred over their 1,2-isomers, 3,3'-dimethyl-4,4'-diaminodicyclohexylmethane, 4,4'-diaminodicyclohexylmethane, isophoronediamine, 2,2-dimethylpropane-1,3-diamine, 4,7,10-trioxatridecane-1,13-diamine, 4,9-dioxadodecane-1,12-diamine, polyetheramines, and 3-(methylamino)propylamine. Preferred are 1,2-ethylenediamine and 1,4-butanediamine.

More preferably the PPI of the invention is prepared by catalytic polytransamination of propanediamine, preferably of propane-1,3-diamine, without further diamines.

Accordingly, in one preferred embodiment of the invention, the substantially linear PPI is constructed solely of propanediamine structural elements (N—CH$_2$—CH$_2$—CH$_2$—N or N—CH$_2$—CH(CH$_3$)—N structural elements), more preferably solely of propane-1,3-diamine structural elements (N—CH$_2$—CH$_2$—CH$_2$—N structural elements).

Suitable catalysts for the polytransamination of propanediamine and optionally one or more further diamines are, in particular, heterogeneous catalysts which comprise one or more transition metals selected from the group consisting of Fe, Co, Ni, Ru, Rh, Pd, Os, Ir, and Pt, preferably selected from the group consisting of Co, Ni, Ru, Cu, and Pd, more preferably selected from the group consisting of Co, Ni, and Cu.

The polytransamination of propanediamine optionally together with one or more further diamines may be carried out in the presence of hydrogen, as for example under a hydrogen partial pressure of 1 to 400 bar, preferably of 1 to 200 bar, and more particularly of 1 to 100 bar.

The polytransamination of propanediamine optionally together with one or more further diamines may be carried out at a temperature in a range from 50 to 200° C., preferably in a range from 90 to 180° C., more particularly in a range from 120 to 160° C.

The polytransamination of propanediamine optionally together with one or more further diamines may be carried out at a pressure in the range from 1 to 400 bar, preferably in a range from 1 to 200 bar, more particularly in a range from 1 to 100 bar.

The PPI of the invention has a hydroxyl number of ≤100 mg KOH/g, more preferably of ≤50 mg KOH/g, very preferably of ≤5 mg KOH/g, more particularly of ≤2 mg KOH/g, determined in accordance with DIN 53240. More preferably the PPI of the invention has a hydroxyl number of 0 mg KOH/g or nearly 0 mg KOH/g, and is therefore free or substantially free from hydroxyl groups.

The PPI of the invention preferably has an amine number for primary amines in the range from 10 to 1000 mg KOH/g, preferably from 80 to 800 mg KOH/g, more preferably from 100 to 500 mg KOH/g. The amine number for primary amines is determined in accordance with the standard ASTM D2074-07.

The PPI of the invention preferably has an amine number for secondary amines in the range from 100 to 2000 mg KOH/g, preferably from 200 to 1500 mg KOH/g, more preferably from 300 to 1000 mg KOH/g. The amine number for secondary amines is determined in accordance with the standard ASTM D2074-07.

The PPI of the invention preferably has an amine number for tertiary amines in the range from 0 to 200 mg KOH/g, preferably from 2 to 100 mg KOH/g, more preferably from 5 to 50 mg KOH/g. The amine number for tertiary amines is determined in accordance with the standard ASTM D2074-07.

The PPI of the invention preferably has an amine number for primary amines in the range from 10 to 1000 mg KOH/g, preferably from 80 to 800 mg KOH/g, more preferably from 100 to 500 mg KOH/g, and an amine number for secondary amines in the range from 100 to 2000 mg KOH/g, preferably from 200 to 1500 mg KOH/g, more preferably from 300 to 1000 mg KOH/g, and an amine number for tertiary amines in the range from 0 to 200 mg KOH/g, preferably from 2 to 100 mg KOH/g, more preferably from 5 to 50 mg KOH/g. The amine number for primary, secondary, and tertiary amines is determined in accordance with the standard ASTM D2074-07.

The PPI of the invention, for the tertiary amino groups, preferably has a fraction in the range from 0 to 2 mol %, based on the total amount of nitrogen in the PPI of the invention. Tertiary amino groups are commonly the consequence of the formation of branches or of rings during preparation of PPI.

The PPI of the invention preferably has a number-average molecular weight $M_n$ in a range from 250 to 5000 g/mol, more preferably in a range from 250 to 1000 g/mol, very preferably in a range from 250 to 500 g/mol, determinable by means of size exclusion chromatography. The PPI of the invention preferably has a molar mass distribution $M_w/M_n$ (polydispersity index (PDI), where $M_w$ is the weight-average molecular weight) in a range from 1.1 to 20, more preferably in a range from 1.1 to 10, more particularly from 1.2 to 5.

The PPI of the invention preferably has a vapor pressure at 25° C. of not more than 0.1 Pa, more preferably of not more than 0.02 Pa, more particularly of not more than 0.005 Pa. It therefore has a much lower volatility than comparable hardeners such as TETA, for example.

As an alternative to the polytransamination of diamines, the PPI of the invention may also be prepared by (i) catalytic polycondensation of propanolamine optionally together with one or more further amino alcohols, or (ii) catalytic polycocondensation of propanediol with propanediamine optionally together with one or more further diamines and/or further diols. The further amino alcohols and the further diamines and/or further diols are aliphatic compounds. Examples of aminopropanols are 3-aminopropan-1-ol and 2-aminopropan-1-ol, and mixtures thereof, with 3-aminopropan-1-ol being preferred. Here it is possible for optionally to up to 40 mol %, preferably up to 30 mol %, of the aminopropanol (in the case of catalytic polycondensation (i)) or of the sum of propanediamine and propanediol (in the case of catalytic polycocondensation (ii)) to be replaced by one or more further aliphatic amino alcohols having at least one primary or secondary amino group and at least one OH group (in the case of catalytic polycondensation (i)) or by one or more further aliphatic diols and/or one or more further aliphatic diamines (in the case of catalytic polycocondensation (ii)). The polycondensation (i) and the polycocondensation (ii) can be carried out in the presence of hydrogen, at a hydrogen partial pressure in a range from 1 to 100 bar, for example. They may be carried out at a temperature in a range from 20 to 250° C., preferably at a temperature of at least 100° C. and preferably at a temperature of not more than 200° C. The water formed during the polycondensation (i) or polycocondensation (ii) may be removed preferably during the reaction, by means of distillation, for example. For the polycondensation (i) or the polycocondensation (ii), preferably homogeneous catalysts are used. Suitable homogeneous catalysts for the polycondensation (i) or the polycocondensation (ii) are, for example, transition metal complexes which comprise one or more different transition metals, preferably at least one element from groups 8, 9, and 10 of the Periodic Table of the Elements, more preferably ruthenium or iridium. The corresponding transition metals here are preferably in the form of transition metal complexes. Suitable ligands in this case are, for example, alkyl- or alkylene-substituted phosphines, multidentate phosphines substituted by alkyl or aryl groups and bridged via arylene or alkylene groups, nitrogen-containing heterocyclic carbenes, cyclopentadienyl, pentamethylcyclopentanedienyl, aryl groups, olefin ligands, hydrides, halides, carboxyoxylates, alkoxylates, carbonyls, hydroxides, trialkylamines, dialkylamines, monoalkylamines, nitrogen-containing aromatics such as pyridine or pyrrolidine, for example, and multidentate amines. The transition metal complex here may comprise one or a plurality of different ligands.

The curable composition of the invention may comprise not only the substantially linear PPI but also further polyamines, more particularly aliphatic and cycloaliphatic polyamines, as a constituent of the hardener component. The substantially linear PPI accounts preferably for at least 50 wt %, more preferably at least 80 wt %, very preferably at least 90 wt %, based on the total amount of the aminic hardeners in the curable composition. In one preferred embodiment the curable composition comprises no further aminic hardeners, besides the substantially linear PPI. Aminic hardeners in the context of the present invention are amines having an NH functionality of ≥2 (accordingly, for example, a primary monoamine has an NH functionality of 2, a primary diamine has an NH functionality of 4, and an amine having 3 secondary amino groups has an NH functionality of 3).

Epoxy resins according to this invention possess 2 to 10, preferably 2 to 6, very preferably 2 to 4, and more particularly 2 epoxide groups. The epoxide groups are more particularly glycidyl ether groups, as formed in the reaction of alcohol groups with epichlorohydrin. The epoxy resins may be low molecular mass compounds, which generally have an average molar weight ($M_n$) of less than 1000 g/mol, or higher molecular mass compounds (polymers). Such polymeric epoxy resins preferably have a degree of oligomerization of 2 to 25, more preferably of 2 to 10 units. They may be aliphatic, alternatively cycloaliphatic compounds, or compounds with aromatic groups. More particularly the epoxy resins are compounds having two aromatic or aliphatic 6-membered rings, or oligomers thereof. Significant industrially are epoxy resins which are obtainable by reaction of epichlorohydrin with compounds having at least two reactive H atoms, more particularly with polyols. Of particular significance are epoxy resins which are obtainable by reaction of epichlorohydrin with compounds which comprise at least two, preferably two, hydroxyl groups and two aromatic or aliphatic 6-membered rings. Such compounds include, in particular, bisphenol A and bisphenol F, and also hydrogenated bisphenol A and bisphenol F—the corresponding epoxy resins are the diglycidyl ethers of bisphenol A or bisphenol F, or of hydrogenated bisphenol A or bisphenol F. An epoxy resin commonly used in accordance with this invention is the diglycidyl ether of bisphenol A (DGEBA). Suitable epoxy resins in accordance with this invention are also tetraglycidylmethylenedianiline (TG-MDA) and triglycidylaminophenol, or mixtures thereof. Also contemplated are reaction products of epichlorohydrin with other phenols, as for example with cresols, or phenol-aldehyde adducts, such as phenol-formaldehyde resins, more particularly novolaks. Also suitable are epoxy resins which do not derive from epichlorohydrin. Examples of those contemplated include epoxy resins which contain epoxide groups through reaction with glycidyl (meth)acrylate. In accordance with the invention, preference is given to using epoxy resins or mixtures thereof which are liquid at room temperature (25° C.). The epoxide equivalent weight (EEW) indicates the average mass of the epoxy resin in g per mol of epoxide group.

The epoxy resin content of the curable composition of the invention is preferably at least 50 wt %.

One particular embodiment of the invention concerns a curable composition which comprises a resin component and a hardener component, the resin component comprising one or more epoxy resins and one or more reactive diluents, and the hardener component comprising PPI which is substantially linear.

Reactive diluents in the sense of the invention are compounds which lower the initial viscosity of the curable composition and which in the course of the curing of the curable composition form a chemical bond with the developing network of epoxy resin and hardener. Preferred reactive diluents in the sense of this invention are low molecular mass organic compounds, preferably aliphatic compounds, having one or more epoxide groups, preferably having two epoxide groups, and also cyclic carbonates, more particularly cyclic carbonates having 3 to 10 C atoms, as for example ethylene carbonate, propylene carbonate, butylene carbonate, or vinylene carbonate.

Reactive diluents of the invention are preferably selected from the group consisting of ethylene carbonate, vinylene carbonate, propylene carbonate, 1,4-butanediol bisglycidyl ether, 1,6-hexanediol bisglycidyl ether (HDDE), glycidyl neodecanoate, glycidyl versatate, 2-ethylhexyl glycidyl ether, neopentyl glycol diglycidyl ether, p-tert-butyl glycidyl ether, butyl glycidyl ether, $C_8$-$C_{10}$-alkyl glycidyl ether, $C_{12}$-$C_{14}$-alkyl glycidyl ether, nonylphenyl glycidyl ether, p-tert-butylphenyl glycidyl ether, phenyl glycidyl ether, o-cresyl glycidyl ether, polyoxypropylene glycol diglycidyl ether, trimethylolpropane triglycidyl ether (TMP), glycerol triglycidyl ether, triglycidyl-para-aminophenol (TGPAP), divinylbenzyl dioxide, and dicyclopentadiene diepoxide. They are more preferably selected from the group consisting of 1,4-butanediol bisglycidyl ether, 1,6-hexanediol bisglycidyl ether (HDDE), 2-ethylhexyl glycidyl ether, $C_8$-$C_{10}$-alkyl glycidyl ether, $C_{12}$-$C_{14}$-alkyl glycidyl ether, neopentyl glycol diglycidyl ether, p-tert-butyl glycidyl ether, butyl glycidyl ether, nonylphenyl glycidyl ether, p-tert-butylphenyl glycidyl ether, phenyl glycidyl ether, o-cresyl glycidyl ether, trimethylolpropane triglycidyl ether (TMP), glycerol triglycidyl ether, dvinylbenzyl dioxide, and dicyclopentadiene diepoxide. They are more particularly selected from the group consisting of 1,4-butanediol bisglycidyl ether, $C_8$-$C_{10}$-alkyl monoglycidyl ether, $C_{12}$-$C_{14}$-alkyl monoglycidyl ether, 1,6-hexanediol bisglycidyl ether (HDDE), neopentyl glycol diglycidyl ether, trimethylolpropane triglycidyl ether (TMP), glycerol triglycidyl ether, and dicyclopentadiene diepoxide.

In one particular embodiment of the present invention, the reactive diluents are low molecular mass organic compounds having two or more, preferably two, epoxide groups, examples being 1,4-butanediol bisglycidyl ether, 1,6-hexanediol bisglycidyl ether (HDDE), neopentyl glycol diglycidyl ether, polyoxypropylene glycol diglycidyl ether, trimethylolpropane triglycidyl ether (TMP), glycerol triglycidyl ether, triglycidyl-para-aminophenol (TGPAP), divinylbenzyl dioxide, or dicyclopentadiene diepoxide, preferably 1,4-butanediol bisglycidyl ether, 1,6-hexanediol bisglycidyl ether (HDDE), neopentyl glycol diglycidyl ether, trimethylolpropane triglycidyl ether (TMP), glycerol triglycidyl ether, divinylbenzyl dioxide, or dicyclopentadiene diepoxide, more particularly 1,4-butanediol bisglycidyl ether, 1,6-hexanediol bisglycidyl ether (HDDE), neopentyl glycol diglycidyl ether, trimethylolpropane triglycidyl ether (TMP), glycerol triglycidyl ether, or dicyclopentadiene diepoxide. In one particular embodiment, the reactive diluents are low molecular mass aliphatic compounds having two or more, preferably two, epoxide groups.

In one particular embodiment of the present invention, the reactive diluents are low molecular mass organic compounds having one epoxide group, examples being glycidyl neodecanoate, glycidyl versatate, 2-ethylhexyl glycidyl ether, p-tert-butyl glycidyl ether, butyl glycidyl ether, $C_8$-$C_{10}$-alkyl glycidyl ether, $C_{12}$-$C_{14}$-alkyl glycidyl ether, nonylphenyl glycidyl ether, p-tert-butylphenyl glycidyl ether, phenyl glycidyl ether, or o-cresyl glycidyl ether, preferably 2-ethylhexyl glycidyl ether, p-tert-butyl glycidyl ether, butyl glycidyl ether, $C_8$-$C_{10}$-alkyl glycidyl ether, $C_{12}$-$C_{14}$-alkyl glycidyl ether, nonylphenyl glycidyl ether, p-tert-butylphenyl glycidyl ether, phenyl glycidyl ether, or o-cresyl glycidyl ether, more particularly $C_8$-$C_{10}$-alkyl glycidyl ether or $C_{12}$-$C_{14}$-alkyl glycidyl ether. In one particular embodiment, the reactive diluents are low molecular mass aliphatic compounds having one epoxide group.

In one particular embodiment of the present invention, the reactive diluents are cyclic carbonates having 3 to 10 C atoms, as for example ethylene carbonate, propylene carbonate, butylene carbonate, or vinylene carbonate, preferably ethylene carbonate, propylene carbonate, or vinylene carbonate.

The reactive diluents of the invention account preferably for a fraction of up to 30 wt %, more preferably up to 25 wt %, more particularly from 1 to 20 wt %, based on the resin component (epoxy resin and any reactive diluents used) of the curable composition. The reactive diluents of the invention account preferably for a fraction of up to 25 wt %, more preferably up to 20 wt %, more particularly from 1 to 15 wt %, based on the overall curable composition.

In the case of the curable composition of the invention, the compounds of the resin component (epoxy resins, including any reactive diluents with their respective reactive groups) and aminic hardeners are preferably used in an approximately stoichiometric ratio based on the reactive groups of the compounds of the resin component (epoxide groups and, for example, any carbonate groups) and on the NH functionality. Particularly suitable ratios of reactive groups of the compounds of the resin component to NH functionality are, for example, 1:0.8 to 1:1.2. Reactive groups of the compounds of the resin component are those groups which under the conditions of curing react chemically with the amino groups of the amino hardener or of the amino hardeners.

The curable composition of the invention may also comprise further additions such as, for example, inert diluents, curing accelerants, reinforcing fibers (more particularly glass fibers or carbon fibers), pigments, dyes, fillers, release agents, tougheners, flow agents, anti-foamers, flame retardants, or thickeners. Such additions are typically added in a functional amount—in other words, for example, a pigment in an amount which leads to the desired color for the composition. The compositions of the invention typically comprise from 0 to 50 wt %, preferably 0 to 20 wt %, as for example 2 to 20 wt %, for the entirety of all the additives, based on the overall curable composition. Additives in the context of this invention are all additions to the curable composition that are neither epoxide compounds nor aminic hardeners.

The present invention also concerns the use of substantially linear PPI as a hardener for epoxy resins in curable compositions, more particularly for producing coatings, particularly floor coatings with early water resistance.

The present invention preferably concerns the use of substantially linear PPI as a hardener for epoxy resins in curable compositions with one or more reactive diluents.

The invention further provides a process for preparing cured epoxy resins from the curable composition of the invention. In the process of the invention for preparing such cured epoxy resins, the components (epoxy resin, substantially linear PPI, and any further components, such as additives, for example) are contacted with one another in any order, mixed, and thereafter cured at a temperature practicable for the application. Curing takes place preferably at a temperature of at least 0° C., more preferably of at least 10° C.

In one particular embodiment, the cured epoxy resin is additionally subjected to a thermal aftertreatment, as part of the curing or as part of an optional downstream heat treatment, for example.

Curing may take place under atmospheric pressure and at temperatures of less than 250° C., more particularly at temperatures of less than 210° C., preferably at temperatures of less than 185° C., more particularly in a temperature range from 0 to 210° C., very preferably in a temperature range from 10 to 185° C.

Curing takes place, for example, in a mold until dimensional stability is reached and the workpiece can be removed from the mold. The subsequent operation for removing inherent stresses in the workpiece and/or for completing the crosslinking of the cured epoxy resin is called heat-conditioning. In principle it is also possible to carry out the heat-conditioning operation before the workpiece is removed from the mold, for the purpose of completing the crosslinking, for instance. The heat-conditioning operation takes place typically at temperatures at the limit of dimensional stiffness. Heat-conditioning takes place typically at temperatures of 120 to 220° C., preferably at temperatures of 150 to 220° C. The cured workpiece is exposed to the heat-conditioning conditions for a time, typically, of 30 to 240 minutes. Longer heat-conditioning times may also be appropriate, depending on the workpiece dimensions.

Further provided by the invention is the cured epoxy resin from the curable composition of the invention. Provided more particularly by the invention is cured epoxy resin which is obtainable or obtained by curing of a curable composition of the invention. Provided by the invention more particularly is cured epoxy resin which is obtainable or obtained by the process of the invention for preparing cured epoxy resins.

The curable compositions of the invention are suitable as coating or impregnating materials, as adhesive, for producing moldings and composite materials, or as casting compositions for embedding, binding, or strengthening of moldings. They are suitable more particularly for the production of moldings by the RTM method. Coating materials include, for example, paints and, in particular, floor coatings. With the curable compositions of the invention it is possible in particular to obtain scratch-resistant protective coatings on any desired substrates, made of metal, plastic, or woodbase materials, for example. The curable compositions are also suitable as insulating coatings in electronics applications, such as an insulating coating for wires and cables, for example. Their use for producing photoresists may also be stated. They are additionally suitable as repair coating material, including, for example, in the renovation of pipes without disassembly (cure in place pipe (CIPP) rehabilitation). They are especially suitable for sealing floors. They are also suitable for producing composite materials.

In composite materials (composites), different materials are joined to one another, examples being plastics and reinforcing materials (e.g., glass fibers or carbon fibers).

Production processes for composite materials include the curing of preimpregnated fibers or fiber fabrics (e.g., prepregs) after storage, or else extrusion, pultrusion, winding, and infusion/injection processes such as vacuum infusion (VARTM), resin transfer molding (RTM), and wet compression molding processes such as BMC (bulk mold compression).

Further subjects of the invention relate to moldings composed of the cured epoxy resin of the invention, composite materials which comprise the cured epoxy resin of the invention, and fibers impregnated with the curable composition of the invention. The composite materials of the invention comprise preferably glass fibers and/or carbon fibers as well as the cured epoxy resin of the invention.

Further subjects of the invention relate to coatings, preferably floor coatings, comprising the cured epoxy resin of the invention. More particularly these are coatings with early water resistance.

The glass transition temperature (Tg) may be determined using dynamic mechanical analysis (DMA), in accordance for example with the standard DIN EN ISO 6721, or with a differential calorimeter (DSC), in accordance for example with the standard DIN 53765. In the case of DMA, a rectangular specimen is subjected to torsional load at an imposed frequency and with prescribed deformation. The temperature here is raised with a defined ramp, and storage modulus and loss modulus are recorded at fixed time intervals. The former represents the stiffness of a viscoelastic material. The latter is proportional to the energy dissipated in the material. The phase displacement between the dynamic stress and the dynamic deformation is characterized by the phase angle δ. The glass transition temperature can be determined by a variety of methods: as the maximum of the tan δ curve, as the maximum of the loss modulus, or by means of a tangential method applied to the storage modulus. When the glass transition temperature is determined using a differential calorimeter, a very small volume of sample (approximately 10 mg) is heated in an aluminum crucible and the heat flux is measured in relation to a reference crucible. This cycle is repeated three times. The glass transition is determined as an average from the second and third measurements. The Tg stage of the heat flux curve can be determined via the inflection point, by a half-width method or by the midpoint temperature method.

The term "potlife" refers to a parameter which is typically utilized in order to compare the reactivity of different resin/hardener and/or resin/hardener-mixture combinations. Potlife measurement is a method for characterizing the reactivity of laminating systems by means of a temperature measurement. Depending on application, deviations from the parameters described therein (quantity, test conditions, and measurement method) have become established. The potlife here is determined as follows: 100 g of the curable composition, comprising epoxy resin and hardener or hardener mixture, are placed in a vessel (typically a paper cup). A temperature sensor is immersed into this curable composition, and measures and records the temperature at particular time intervals. As soon as this curable composition has solidified, measurement is ended and the time to attainment of the maximum temperature is ascertained. If the reactivity of a curable composition is too low, this measurement is carried out at elevated temperature. When the potlife is stated, the testing temperature must always be stated as well.

The gelling time, according to DIN 16 945, indicates the period of time between the addition of the hardener to the reaction mixture and the transition of the reactive resin composition from the liquid state to the gel state. The temperature plays an important part here, and the gel time is therefore found in each case for a specified temperature. With the aid of dynamic-mechanical methods, especially rotational viscometry, it is possible to examine even small amounts of sample quasi-isothermally and to record the entire viscosity or stiffness profile thereof. According to standard ASTM D 4473, the point of intersection between the storage modulus G' and the loss modulus G", where the damping tan δ has a value of 1, is the gel point, and the period of time from addition of the hardener to the reaction mixture to attainment of the gel point is the gelling time. The gelling time thus determined may be regarded as a measure of the curing rate.

The Shore hardness is an index for polymers, such as cured epoxy resins, for example, which is directly related to the penetration depth of an indenter into the test specimen, and is thus a measure of the hardness of that specimen. It is determined, for example, in accordance with standard DIN ISO 7619-1. A distinction is made between the Shore A, C, and D methods. The indenter used is a spring-loaded pin made from hardened steel. This indenter is pressed into the test specimen with spring force, and the penetration depth represents a measure of the Shore hardness. While the indenter used for the determination of Shore hardnesses A and C is a frustocone having an end face of 0.79 mm in diameter and an opening angle of 35°, the indenter used in the Shore D hardness test is a frustocone having a conical tip with a radius of 0.1 mm and an opening angle of 30°. For the determination of the Shore hardness characteristics, a scale has been introduced that ranges from 0 Shore (2.5 mm penetration depth) to 100 Shore (0 mm penetration depth). The value 0 on this scale corresponds to the maximum possible impression, meaning that the material offers no resistance to the penetration of the indenter. In contrast, the scale value 100 corresponds to very high resistance of the material to the penetration, and virtually no impression is produced. In the determination of the Shore hardness, a crucial role is played by temperature, and so the measurements have to be conducted as per the standard within a restricted temperature interval of 23° C.±2° C.

Early water resistance is the capacity of a coating, just a short time after application, to experience water contact without suffering damage. In the case of coatings based on epoxy resins and aminic hardeners, the relevant factor, in particular, is formation of carbamate, which is apparent from the development of white streaks or crusts on the surface of the fresh coating.

The invention is now elucidated in more detail by the following, nonlimiting examples.

EXAMPLE 1

Preparation of Substantially Linear Polypropyleneimine (PPI)

The polymerization of 1,3-propanediamine is carried out in 0.2 L reactor (length 0.5 m, diameter 3.8 cm) made of stainless steel (1.4571). The reactor was filled with 0.27 kg of an all-active cobalt catalyst (prepared according to EP636409A (example catalyst A)). In upflow mode, 0.12 kg of 1,3-propanediamine and 10 L (stp) of hydrogen per hour were passed over the catalyst at 160° C. under a total hydrogen pressure of 50 bar. The space velocity over the catalyst was 0.8 kg per liter of catalyst per hour. The reaction effluent was condensed, and 1,3-propanediamine, dimers, and trimers were removed from the polymer mixture by distillation in an evaporator at 250° C. and 5 mbar. For this product, determinations were made of the amine numbers and also, by means of size exclusion chromatography, of the molar masses $M_n$ and $M_w$, and also of the polydispersity index (PDI) (table 1).

TABLE 1

| Characterization of the PPI prepared | |
|---|---|
| Amine number (primary) | 269 |
| Amine number (secondary) | 786 |
| Amine number (tertiary) | 11 |
| $M_n$ (g/mol) | 289 |
| $M_w$ (g/mol) | 405 |
| PDI | 1.4 |

COMPARATIVE EXAMPLE 1

Preparation of Branched PPI with the Formula
(H$_2$N—CH$_2$—CH$_2$—CH$_2$—)$_2$N—CH$_2$—CH$_2$—N
(—CH$_2$—CH$_2$—CH$_2$—NH$_2$)$_2$ (EDA-dendr-(NH$_2$)$_4$)

EDA-dendr-(NH$_2$)$_4$ was prepared by addition of acrylonitrile onto ethylenediamine with subsequent hydrogenation of the nitrile groups, in accordance with the following reaction equations:

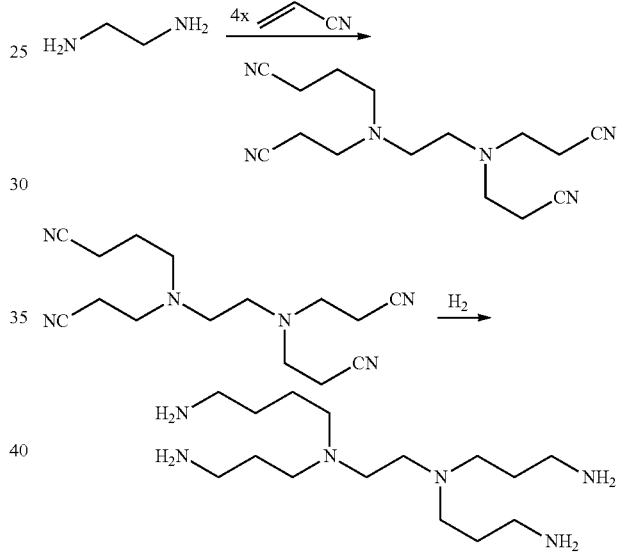

For this purpose, a 2 L jacketed vessel with condenser and dropping funnel was charged with 60 g of ethylenediamine (1 mol) in 800 g of water (44 mol). At a temperature of 40° C., 212 g of acrylonitrile (4 mol) were metered in over a period of 3 hours. To complete the reaction, the mixture was heated to 60° C. and a further 53 g of acrylonitrile (1 mol) were added. GC analysis demonstrated full conversion. Excess acrylonitrile was scavenged by adding 100 g of a 40% strength aqueous dimethylamine solution. The batch was cooled to 5° C. with stirring, and discharged. The two-phase liquid mixture was separated in a separating funnel. The solid (27 g) which crystallized from the upper phase was isolated by suction filtration, washed with water, and dried in a stream of air. The lower phase was melted in an oil bath at 70° C. and poured into 1000 g of ethanol (adulterated with 5% toluene) at 60° C. As a result of heating to about 65° C., the mixture turned clear. After slow cooling with stirring to 15° C., the precipitated solid (212 g) was isolated by suction filtration, washed with a little ethanol and dried by suction. GC-MS confirmed the fourfold addition of acrylonitrile onto ethylenediamine. The resulting solid possessed a purity of >96%.

Subsequently, in a 300 mL autoclave, 43 g of the tetranitrile (156 mmol) were dissolved in 50 g of THF (690 mmol). 10 g of Raney Co were added and 26 g of ammonia (1500 mmol) were injected. Hydrogen was injected to 100 bar and the system was heated to 70° C. Over the course of 1 hour, hydrogenation was carried out to constant pressure. The reaction effluent was subjected to pressure filtration in order to remove the catalyst, and was then distilled (1 mbar, 250° C.). The product was isolated with a purity >99%. GC-MS confirmed the structure of the product.

EXAMPLE 2

Preparation of the Curable Composition (Reactive Resin Composition) and Investigation of the Reactivity Profile The formulations for comparison with one another were prepared by mixing stoichiometric amounts of the respective amine (TETA (Huntsman), D230 (Polyetheramine D230 BASF), EDA-dendr-$(NH_2)_4$ (from comparative example 1) or PPI (from example 1), respectively, with a bisphenol A diglycidyl ether-based epoxy resin (Epilox A19-03, Leuna Harze, EEW 182) and were investigated immediately.

The rheological measurements for investigating the reactivity profile of the cycloaliphatic amines with epoxy resins were carried out on a shear rate-controlled plate-plate rheometer (MCR 301, Anton Paar) having a plate diameter of 15 mm and a gap distance of 0.25 mm, at different temperatures.

Investigation 1a) Comparison of the time required for the freshly prepared reactive resin composition to attain a viscosity of 10 000 mPa*s at a defined temperature. The measurement was carried out in rotation on the aforementioned rheometer at different temperatures (23° C. and 75° C.). Determinations were made at the same time of the initial viscosity (averaged over the period from 2 to 5 minutes after mixing of the components) for the respective mixtures at the respective temperatures. The results are summarized in table 2.

TABLE 2

| Isothermal viscosity rise to 10 000 mPa * s | | | | |
|---|---|---|---|---|
| | TETA | D230 | PPI | EDA-dendr-$(NH_2)_4$ |
| Time span to viscosity of 10 000 mPa * s at 23° C. | 115 min | 478 min | 96 min | 30 min |
| Time span to viscosity of 10 000 mPa * s at 75° C. | 6.5 min | 40 min | 6 min | 4 min |
| Initial viscosity at 23° C. | 336 mPa * s | 886 mPa * s | 819 mPa * s | 4200 mPa * s |
| Initial viscosity at 75° C. | 100 mPa * s | 39 mPa * s | 192 mPa * s | 1836 mPa * s |

PPI and TETA show a similar reactivity profile, while D230 is much less reactive. In comparison to the inventive PPI, the initial viscosity is much higher when the branched EDA-dendr-$(NH_2)_4$ is used, and the increase in viscosity is much faster as well, particularly at low temperatures, of the kind relevant, for example, for floor coating applications.

Investigation 1b) Comparison of the gelling times. The measurement was carried out in oscillation on the aforementioned rheometer at a temperature of 23° C. or 75° C., respectively. The point of intersection of loss modulus (G") and storage modulus (G') yields the gelling time. The results of the measurements are summarized in table 3.

TABLE 3

| Isothermal gelling times | | | | |
|---|---|---|---|---|
| | TETA | D230 | PPI | EDA-dendr-$(NH_2)_4$ |
| at 23° C. | 275 min | 1850 min | 304 min | 274 min |
| at 75° C. | 10 min | 60 min | 8 min | 7 min |

Investigation 1c) Comparison of the potlives. 100 g of each of the reactive resin compositions were stirred in a paper cup, provided with a temperature sensor, and stored at a temperature of 23° C. The temperature of the sample was recorded as a function of the time. The time in which the sample reached the maximum temperature is the potlife. The results are summarized in table 4.

TABLE 4

| Potlives at 23° C. (figure in brackets is the maximum temperature attained) | | | |
|---|---|---|---|
| | TETA | D230 | PPI |
| at 23° C. storage temperature | 44 min (243° C.) | 783 min (32° C.) | 52 min (232° C.) |

EXAMPLE 2

Exothermic Profile of the Curable Composition (Reactive Resin Composition) and Glass Transition Temperatures of the Cured Epoxy Resins (Cured Thermosets)

The DSC analyses of the curing reaction of the stoichiometrically employed amines (TETA (Huntsman), D230 (Polyetheramine D230, BASF), EDA-dendr-$(NH_2)_4$ (from comparative example 1) or PPI (corresponding to example 1)), respectively, with a bisphenol A diglycidyl ether-based epoxy resin (Epilox A19-03, Leuna Harze, EEW 182) for determining onset temperature (To) and exothermic energy (H), and also the determination of the glass transition temperatures (Tg) with the temperature program (0° C.→5 K/min 180° C.→30 min 180° C.→20 K/min 0° C.→20 K/min 220° C.) were carried out according to ASTM D 3418. In each case, 2 runs were conducted. The results of the measurements are summarized in table 5. Indicated is the Tg measurement from the 2nd run of the temperature program (Tg-I), and after a further curing step (2 h 80° C., 3 h 125° C.) (Tg-II).

TABLE 5

Exothermic profile and glass transition temperatures

|  | TETA | D230 | PPI | EDA-dendr-(NH$_2$)$_4$ |
|---|---|---|---|---|
| To | 62° C. | 83.3° C. | 63.6° C. | 65.4° C. |
| H | 602.9 J/g | 421.9 J/g | 557.9 J/g | 561.6 J/g |
| Tg-I | 136.7° C. | 93° C. | 129.2° C. | 135° C. |
| Tg-II | 137.5° C. | 95.9° C. | 134.9° C. | 136° C. |

In spite of increased chain length and thus increased intramolecular flexibility, PPI exhibits a comparatively high Tg.

EXAMPLE 3

Mechanical Tests on the Cured Epoxy Resins
(Cured Thermosets)

To investigate the mechanical properties of the thermosets formed from amines (TETA (Huntsman), D230 (Polyetheramine D230, BASF), and PPI (corresponding to example 1)) with a bisphenol A diglycidyl ether-based epoxy resin (Epilox A19-03, Leuna Harze, EEW 182), the two components were mixed in a Speedmixer (1 min at 2000 rpm), the mixtures were degassed by application of reduced pressure (1 mbar) at 23° C., and then moldings were fabricated. Curing took place at 80° C. for 2 hours and then at 125° C. for 3 hours. The mechanical tests were carried out according to ISO 527-2: 1993 and ISO 178: 2006. In addition, determinations were made of the Shore D hardness of the cured (2 h at 80° C. and then 3 h at 125° C.) moldings (3 mm thickness) at 23° C. using a durometer (TI Shore test unit, Sauter Messtechnik). The results are summarized in table 6.

TABLE 6

Mechanical properties and Shore D hardness of the thermosets

|  | TETA | D230 | PPI |
|---|---|---|---|
| Tensile strength (in MPa) | 72.5 | 59.36 | 57.52 |
| Tensile elongation (in %) | 6.15 | 5.05 | 5.04 |
| Tensile modulus (in MPa) | 2854 | 2840 | 2450 |
| Flexural strength (in MPa) | 105.26 | 97.39 | 85.83 |
| Flexural elongation (in %) | 6.01 | 6.08 | 5.75 |
| Flexural modulus (in MPa) | 2953 | 3011 | 2497 |
| Shore D hardness | 91 | 90 | 87 |

PPI hardened epoxy resin proves to be more flexible (lower tensile modulus and flexural modulus) as compared with TETA or D230 hardened epoxy resin, the elongation at break attained being similar by comparison with D230.

EXAMPLE 4

Early Water Resistance of the Thermosets

To investigate the early water resistance of the thermosets formed from amines (TETA (Huntsman), D230 (Polyetheramine D230, BASF), and PPI (corresponding to example 1)) with a bisphenol A diglycidyl ether-based epoxy resin (Epilox A19-03, Leuna Harze, EEW 182), the two components were mixed in stoichiometric ratio in a Speedmixer (1 min at 2000 rpm), and the mixtures were poured into a number of bowls and stored at 23° C. in a climatic cabinet (60% relative humidity). At regular intervals of time, one bowl was removed and the surface of the epoxy resin received 2 ml of distilled water. A determination was made of the time after which the epoxy resin on water contact no longer shows any formation of carbamate, and hence when early water resistance has been achieved. Formation of carbamate is evident from development of crusts or white haze on the surface of the epoxy resin. The results are summarized in table 7.

TABLE 7

Early water resistance for epoxy resin compositions with different hardeners ($t_E$: time span to attainment of early water resistance)

|  | TETA | D230 | PPI |
|---|---|---|---|
| $t_E$ at 23° C. (in h) | 6 | >10 | 6 |

The early water resistance of PPI hardened epoxy resin is comparable with that of TETA hardened epoxy resin and much better than that of D230 hardened epoxy resin.

The invention claimed is:

1. A curable composition comprising
a resin component and a hardener component, wherein
the resin component comprises one or more epoxy resins,
the hardener component comprises a polypropyleneimine that is substantially linear, and
the resin component and the hardener component are comprised in the curable composition in an approximately stoichiometric ratio, based on the reactive groups of the one or more epoxy resins and any reactive diluents, if present, and on the NH functionality of the hardener component.

2. The curable composition according to claim 1, wherein the resin component further comprises one or more reactive diluents.

3. The curable composition according to claim 2, wherein the reactive diluent is a low molecular mass organic compound comprising one or more epoxide groups or a cyclic carbonate having 3 to 10 C atoms.

4. The curable composition according to claim 1, wherein the polypropyleneimine has a number-average molecular weight $M_n$ of 100 g/mol to 1000 g/mol.

5. The curable composition according to claim 1, wherein the polypropyleneimine has a degree of branching, $DB_{HF}$, of ≤0.3,
where $DB_{HF}=2D/(2D+L)$, with D corresponding to the fraction of tertiary amino groups and L corresponding to the fraction of secondary amino groups.

6. The curable composition according to claim 1, wherein the polypropyleneimine has an amine number for primary amines of 10 mg to 1000 mg KOH/g, an amine number for secondary amines of 100 mg to 2000 mg KOH/g and an amine number for tertiary amines of 0 mg to 200 mg KOH/g.

7. The curable composition according to claim 1, wherein the polypropyleneimine is prepared by catalytic polytransamination of propanediamine.

8. The curable composition according to claim 1, wherein the polypropyleneimine is constructed solely of propanediamine structural elements.

9. The curable composition according to claim 1, wherein
the resin component and the polypropyleneimine are comprised in the curable composition in an approximately stoichiometric ratio, based on the reactive groups of the one or more epoxy resins and any reactive diluents, if present, and on the NH functionality of the polypropyleneimine.

10. The curable composition according to claim 1, wherein the one or more epoxy resins are selected from the group consisting of diglycidyl ether of bisphenol A, diglycidyl ether of bisphenol F, diglycidyl ether of hydrogenated bisphenol A, and diglycidyl ether of hydrogenated bisphenol F.

11. A process for preparing a cured epoxy resin, comprising:
curing the curable composition according to claim 1.

12. A cured epoxy resin obtained by the process according to claim 11.

13. A molding comprising the cured epoxy resin according to claim 12.

14. A composite material comprising the cured epoxy resin according to claim 12 and one or more reinforcing fibers.

15. A coating comprising the cured epoxy resin according to claim 12.

16. A cured epoxy resin obtained by curing the curable composition according to claim 1.

17. A molding comprising the cured epoxy resin according to claim 16.

18. A composite material comprising the cured epoxy resin according to claim 16 and one or more reinforcing fibers.

19. A coating comprising the cured epoxy resin according to claim 16.

* * * * *